Patented Sept. 16, 1969

3,467,703
CHLOROFORMYL CARBOCYCLIC COMPOUNDS
Louis G. Anello, Basking Ridge, and Richard F. Sweeney,
  Randolph Township, Morris County, N.J., assignors to
  Allied Chemical Corporation, New York, N.Y., a corporation of New York
No Drawing. Filed Feb. 28, 1964, Ser. No. 348,274
     Int. Cl. C07c 61/26, 61/20
U.S. Cl. 260—544                                    2 Claims This invention relates to the production of novel five and six membered chloroformyl carbocyclic compounds and, more specifically, to 1-chloro-2-chloroformylhexafluorocyclopentene-1 and 1-chloro-2-chloroformyloctafluorocyclohexene-1.

These compounds have utility as solvents and sealing adjuvants for films of copolymers of trifluorochloroethylene and vinylidene fluoride. For example, when a saturated solution of the same film in one of the subject compounds is placed between the surfaces of the films to be sealed, substantially greater seal strengths than those attained for untreated film can be effected at the same sealing temperatures. A temperature of less than 400° F. may be used for effective sealing of the treated film whereas temperatures greater than 400° F. are needed to effectively seal the untreated film. The untreated film generally melts before a sufficiently high temperature to attain a seal strength equivalent to that of the treated film is reached.

An object of this invention is to provide novel chemical compounds, 1-chloro-2-chloroformylhexafluorocyclopentene-1 and 1-chloro-2-chloroformyloctafluorocyclohexene-1. Another object is to educe a novel process for the preparation of these chloroformyl carbocyclic compounds. Other objects and advantages of this invention will be apparent hereinafter.

In accordance with the invention, a compound selected from the group consisting of 1-chloro-2-chloroformylhexafluorocyclopentene-1, having the formula:

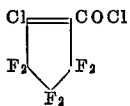

and 1-chloro-2-chloroformyloctafluorocyclohexene-1 having the formula:

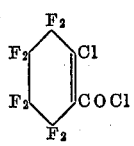

is prepared by chlorinating in the presence of actinic radiation, at a temperature of at least about 70° C., an ether selected from the group consisting of 1-chloro-2-methoxyhexafluorocyclopentene-1 having the formula:

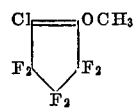

where the compound 1-chloro-2-chloroformylhexafluorocyclopentene-1 is the desired product, and 1-chloro-2-methoxyoctafluorocyclohexene-1 having the formula:

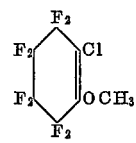

where 1-chloro-2-chloroformyloctafluorocyclohexene-1 is the desired product. It is surprising and contrary to expectation that the chloroformyl compounds are formed because of the inherent stability of fluorinated ethers, which are generally unreactive stable compounds. Rather, it would be expected that the free radical rearrangement whereby a methoxy group is rearranged to an acid chloride without the loss of carbon atoms could not be accomplished with the stable fluorinated ethers.

The precise nature of the reaction, i.e., the mechanics of the free radical rearrangement, is not known. The stoichiometry may be represented by the following equations:

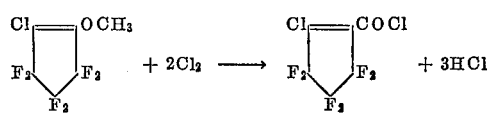

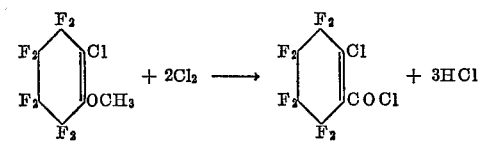

The reaction can be carried out in an ordinary Pyrex vessel, although a higher photon efficiency can be obtained if a vessel made of quartz or "Vycor" glass is used. The reaction vessel can be optionally equipped with a gas inlet dip tube, a condenser, a stirrer, a thermometer, and heating means.

The starting materials, 1-chloro-2-methoxyhexafluorocyclopentene-1 and 1-chloro-2-methoxyoctafluorocyclohexene-1 are liquids at room temperatures. 1-chloro-2-methoxyoctafluorocyclo-hexene-1 is a novel compound prepared by reacting 1,2-dichlorooctafluorocyclohexene with an alkali metal methoxide. The preparation of this material is more particularly described in the copending application of Richard F. Sweeney, filed Feb. 28, 1964, Ser. No. 348,277.

One of the starting materials, referred to hereinafter as ethers, is introduced into the described reaction vessel. The chlorine gas is passed through the ether at a rate sufficient to provide a slight excess at all times. The slight excess is not a requirement of the reaction, but is desirable because a deficiency of chlorine increases the time necessary to complete the reaction. The ratio of chlorine to ether can be about 0.5 mol of chlorine to about 5 mols of chlorine per mol of ether and is preferably about 2.5 mols of chlorine to 3.5 mols of chlorine per mol of ether. The presence of a greater excess of chlorine than is encompassed in the broad range has no detrimental effect on the reaction, but does not increase the yield. The chlorine gas is generally passed through the ether at a rate at which there is efficient utilization of the chlorine, i.e., a rate at which insignificant amounts of unreacted chlorine are evolved from the reaction vessel.

Simultaneously with the passing of the chlorine gas through the ether the reaction mixture must be exposed to actinic radiation. Actinic radiation can be defined as the action of any light which effects chemical change, e.g., any form of light which effects chemical reaction may be employed, such as ordinary sunlight, ultra violet light, commercial incandescent light, and fluorescent light. The preferred form of light is ultra violet. Any commercial mercury arc lamp or sun lamp would be satisfactory to provide ultra violet light. The intensity of the light used is not critical to the process; however, the greater the intensity the faster the reaction will proceed.

The temperature of the reaction must be at least about 70° C. but can be in the range of about 70° C. to about 400° C. and preferably about 130° C. to about 180° C. The upper temperature limit is practically determined by the boiling point of the liquid mixture. However, the reaction can be effected at higher temperatures up to 400° C. in the vapor phase.

The time of the reaction can be determined by measuring the amount of hydrogen chloride gas evolved. Using this determination, the reaction is continued until about 1.5 to about 3 mols of hydrogen chloride have evolved for each mol of ether and is preferably continued until about 2.5 mols to about 3 mols of hydrogen chloride per mol of ether have been evolved. The greater the ratio of hydrogen chloride to ether, the greater the yield of desired product. The reaction time is dependent upon the various factors outlined supra.

The process can be carried out under either atmospheric, sub-atmospheric, or super-atmospheric pressure, but atmospheric pressure is preferable and most practical. The atmosphere is preferably devoid of air or oxygen, which can be swept out by the chlorine gas or can be initially removed from the reaction vessel by sweeping with an inert gas such as nitrogen.

The product, which is a liquid, is typically removed from the reaction mixture after the completion of the reaction by distillation.

The following examples illustrate the present invention. Parts and percentages are by weight.

EXAMPLE I

A one liter 3-neck Pyrex flask equipped with a gas inlet dip tube, a stirrer, a thermometer, and a condenser was charged with 240.5 parts of 1-chloro-2-methoxyhexafluorocyclopentene-1. The apparatus was constructed so that gases exiting from the condenser are passed first through a water scrubber and then through a scrubber containing 10% aqueous sodium hydroxide. 200 parts of chlorine gas were passed into the flask via the dip tube for 27 hours during which the flask was irradiated with a General Electric (RS) Sun Lamp (250 watts). The sun lamp was positioned 1 inch from the flask. The temperature of the flask was maintained within the 130° C. to 150° C. range. 101 parts of hydrogen chloride were evolved. 127 parts of 1-chloro-2-chloroformylhexafluorocyclopentene-1 (B.P. 126–129° C.) was obtained on distillation. The percent of chlorine calculated for $C_6Cl_2F_6O$ was 26.0%. The percent of Cl found on analysis of the product was 25.9%.

EXAMPLE II

A one liter 3-neck flask equipped with a gas inlet dip tube, stirrer, thermometer, and condenser was charged with 240.5 parts of 1-chloro-2-methoxyhexafluorocyclopentene-1. The apparatus was constructed so that gases exiting from the condenser are passed first through a water scrubber and then through a scrubber containing 10% aqueous sodium hydroxide. 200 parts of chlorine gas were passed into the flask via a dip tube for 8 hours while the flask was irradiated with a General Electric (RS) Sun Lamp (250 watts). The lamp was positioned 1 inch from the flask. The temperature of the reaction mixture was maintained within the 130° to 140° C. range. 98 parts of hydrogen chloride were evolved. Distillation of the reaction mixture gave 96 parts of 1-chloro-2-chloroformylhexafluorocyclopentene-1.

EXAMPLE III

A 500 ml. 3-neck flask, fitted with an inlet dip tube, a thermometer, and a reflux condenser was charged with 131 parts of 1-chloro-2-methoxyoctafluorocyclohexene-1. The apparatus was constructed so that gases exiting from the condenser are passed first through a water scrubber and then through a scrubber containing 10% aqueous sodium hydroxide. 113 parts of chlorine were passed into the flask via the dip tube while the contents were irradiated for 7½ hours with a General Electric (RS) Sun Lamp (250 watts), positioned at a distance of 1 inch from the flask. The reaction temperature rose from 154° C. to 171° C. during this period. 47 parts of hydrogen chloride were evolved. Distillation gave 53 parts of 1-chloro-2-chloroformyloctafluorocyclohexene-1 (B.P. 135° C.). The percent of elements calculated for $C_7Cl_2F_8O$ was 26.1% C, 21.8% Cl, and 47.0% F. On analysis, the product was found to contain 26.3% C, 22.4% Cl, and 48.0% F.

EXAMPLE IV

1 - chloro - 2 - chloroformylhexafluorocyclopentene - 1 and 1 - chloro - 2 - chloroformyloctafluorocyclohexene-1 were tested as sealing adjuvants for a thermoplastic film composed of a copolymer of about 96% trifluorochloroethylene and about 4% vinylidene fluoride. Saturated solutions of this film were prepared by separately refluxing 1 - chloro-2-chloroformylhexafluorocyclopentene-1 and 1-chloro-2-chloroformyloctafluorocyclohexene-1 with said film, cooling the mixtures to room temperature, and decanting the solutions from the undissolved film. The strength of the seals prepared by sealing two of these films together with the solutions as compared with the strength of the seal prepared by sealing two of these films together without using the solution is shown in following table. An impulse heat sealer was used. The impulse heat sealer was a Sentinel Impulse Sealer manufactured by Packaging Industries Inc. of Montclair, N.J.

TABLE

| | Temp., °F. | Pressure, p.s.i. | Dwell time, sec. | Wgt. to effect rupture (grams) |
|---|---|---|---|---|
| Films heat-sealed without the use of the solution | 375 | 30 | 3 | <10 |
| Films heat-sealed with a film solution in 1-chloro-2-chloroformylhexafluorocyclopentene-1 | 375 | 30 | 3 | >1,355 |
| Films heat-treated with a film solution in 1-chloro-2-chloroformyloctafluorocyclohexene-1 | 375 | 30 | 3 | >1,810 |

The seal strength was determined by applying the indicated weight (weight to effect rupture) to effect pulling apart of a 1 sq. in. area of sealed film. The film ruptured at a point away from the sealed area. Temperature in ° F. was the heat sealing temperature used. Pressure in p.s.i. was the sealing pressure. Dwell time, sec. is defined as the length of time in seconds during which the heat and pressure were applied to effect the seal.

We claim:
1. A compound having the formula:
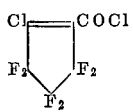
2. A compound having the formula:
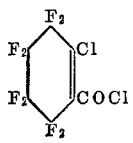
References Cited
FOREIGN PATENTS
625,287  8/1961  Canada.
OTHER REFERENCES
Shepard et al., "J. Org. Chem." vol. 23 (1955) pp. 2011–2012, 260, 611.
LORRAINE A. WEINBERGER, Primary Examiner
V. GARNER, Assistant Examiner
U.S. Cl. X.R.
204—158.5